Jan. 6, 1942.  F. A. ARBOGAST  2,268,541
ARTIFICIAL FISH BAIT
Filed May 23, 1940
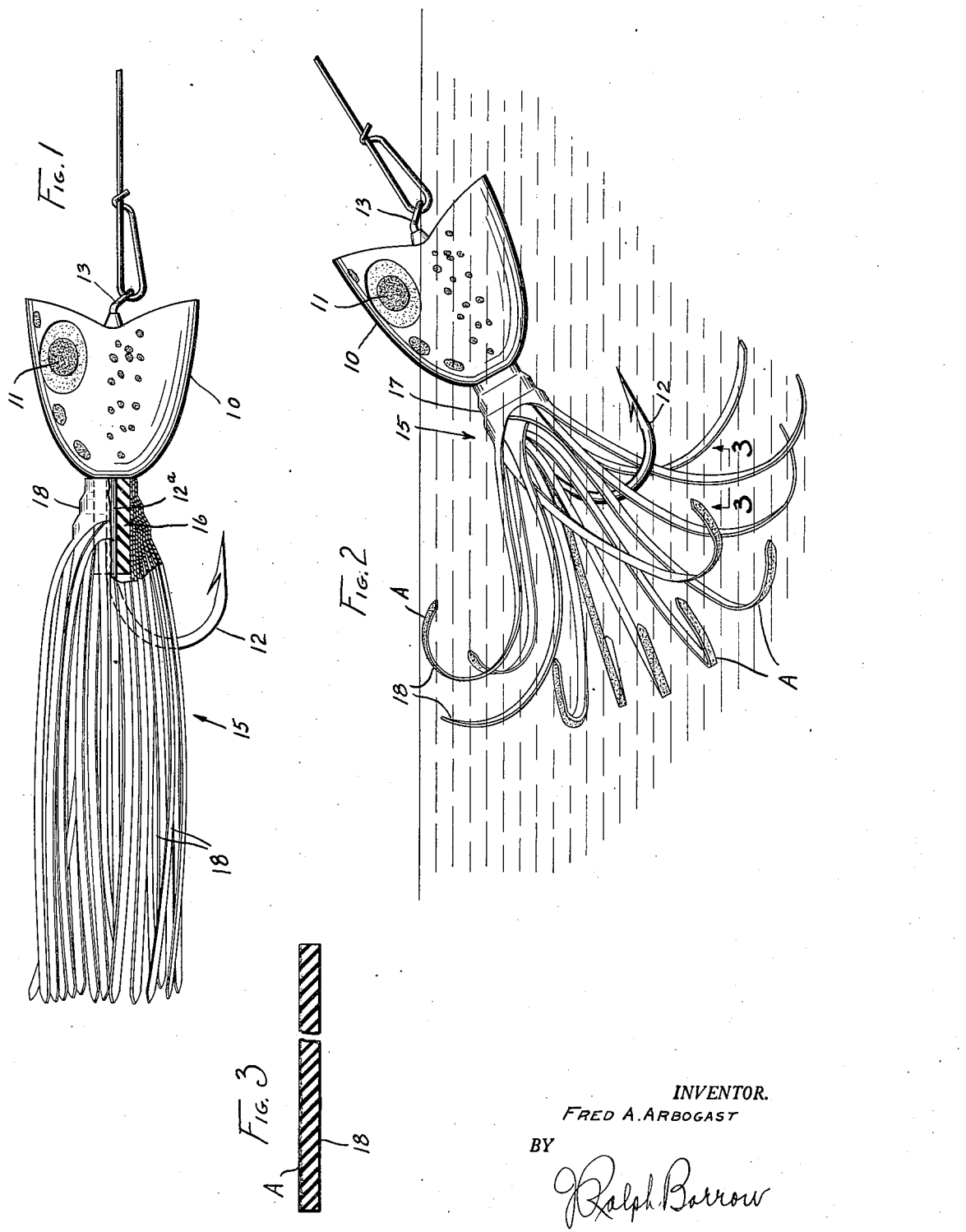
INVENTOR.
FRED A. ARBOGAST
BY
Ralph Borrow Patented Jan. 6, 1942

2,268,541

UNITED STATES PATENT OFFICE 2,268,541

ARTIFICIAL FISH BAIT

Fred A. Arbogast, Akron, Ohio

Application May 23, 1940, Serial No. 336,746

10 Claims. (Cl. 43—42)

This invention relates to artificial fish bait.

An object of this invention is to provide an improved buck-tail or fly, for use on fish baits, which will have life-like movement upon being placed in water, independently of any translational movement of the bait through the water.

Another object of the invention is to provide a buck-tail or fly for artificial bait, in which the strands will not clink together when the bait is placed in water, but will rather spread apart.

These and other objects of the invention will be manifest from the following brief description and the accompanying drawing.

Of the accompanying drawing:

Figure 1 is a side elevation of an artificial fish bait having the improved buck-tail embodying the invention incorporated therein.

Figure 2 is a similar view, illustrating the action of the bait upon being placed in water.

Figure 3 is a cross-section, greatly enlarged and partly broken away, through a strand of the buck-tail, taken substantially on line 3—3 of Figure 2.

Referring to the drawing, the numeral 10 designates a bait body which is suitably colored or decorated to provide a natural appearance, and which for this purpose may have representations of eyes at 11, 11. Secured to one end of the body 10 is a hook 12 and to the other end is an eyelet 13 for securing the usual line in any suitable manner.

Removably received on the stem portion 12ª of hook 12 may be the improved buck-tail or fly 15 embodying the invention. The general construction of the buck-tail may be substantially as shown in the Johnson A. Arbogast Patent No. 2,111,020, filed February 23, 1937. The buck-tail may comprise a relatively short rubber sleeve 16 about which is adhesively wrapped, as by means of rubber cement, a continuous edge portion of one or more strips of thin rubber material 17, these strips being slit or cut from the other edge portions thereof to provide substantially parallel strands or streamers 18, 18. The strip material may be of any suitable color or combinations of colors. It is understood that the sleeve 16 may be omitted and the rubber strips 17 secured directly on the stem 12ª of the hook, or a preformed buck-tail 15 may be attached to a bait body in any other suitable manner.

The strip material 17 may be of vulcanized sheet rubber having a water-absorbing substance or swelling agent, such as powdered starch or flour, cured or impregnated into the surface on one side of the sheet. This may be accomplished, as for example by dusting one side of the sheet with the powdered water-absorbing substance, protecting the other side of the sheet with a layer of "holland cloth," and then vulcanizing the sheet in a suitable platen press. The "holland cloth" preferably is removed before forming the buck-tail from the strips of the material. The water-absorbing substance is thus permanently embedded in the surface of the material, but will be sufficiently exposed, as indicated at A in Figures 2 and 3, to absorb water when the sheet material is immersed therein. The strips 17 may be wrapped to form the buck-tail so that the impregnated sides of the strands 18 will be faced inwardly, whereby when the buck-tail is placed in water the swelling of the water-absorbing substance A will immediately expand the inner surfaces of the strands, thereby causing the same to curl outwardly in the manner of squirming objects.

In the use of the bait for fly casting, for example, during the initial pause of the bait when it strikes the water the strands of the buck-tail will immediately be given a life-like outwardly curling movement, as shown in Figure 2, due to expansion of the swelling agent on the inner surfaces of the strands or streamers 18. Any slight forward movement of the bait body will cause the strands to straighten out, but they will start outward curling movement again each time the bait body becomes stationary in the water. This gives the bait a very desirable life-like appearance in the water, the same being attractive to fish life.

In the usual types of buck-tails or flys, the strands or streamers tend to cling together when wet, and remain in that condition when the bait is placed in water. The present construction obviates this difficulty, because the strands or streamers 18, though they may cling together when wet out of the water, will immediately start to separate upon the bait being placed in the water.

Modifications of the invention may be resorted to without departing from the spirit thereof or the scope of the appended claims.

What is claimed is:

1. An artificial bait comprising a buck-tail or fly having strands of flexible material, the opposite faces of said strands having characteristics which react differently when the bait is placed in water, to cause movement of said strands.

2. An artificial bait comprising a buck-tail or fly having strands of flexible material, one side only of the strands having the characteristic of expanding when the bait is placed in water, to cause movement of said strands.

3. An artificial bait comprising a buck-tail or fly having strands formed of sheet rubber, one side of said strands having incorporated therein an agent adapted to swell when the bait is placed in water, to cause movement of said strands.

4. An artificial bait comprising a buck-tail or fly formed of flexible strip material having a swelling agent incorporated in one side thereof, said agent being adapted to swell when the bait is placed in water to cause said material to curl.

5. An artificial bait comprising a buck-tail or fly formed of sheet rubber vulcanized with a swelling agent incorporated in one face thereof, said agent being adapted to swell when the bait is placed in water to cause said material to curl.

6. An artificial bait comprising a buck-tail or fly formed of flexible strip material and having a plurality of strands, said material being capable of greater swelling on one side than the other, whereby when the bait is placed in water said strands will be caused to move.

7. An artificial bait comprising a buck-tail or fly formed of sheet rubber and having a plurality of strands, said sheet rubber having impregnated therein by vulcanization a substance capable of swelling in the presence of water, whereby when the bait is placed in water said strands will be caused to move.

8. An artificial bait comprising a buck-tail or fly having strands of flexible material, the inner surfaces of said strands having impregnated therein a substance which swells in the presence of water, whereby when the bait is placed in water said strands will move or curl outwardly of the bait.

9. An artificial bait comprising a buck-tail or fly having strands of flexible material, the inner sides of said strands having incorporated therein an agent adapted to swell when the bait is placed in water, to cause said strands to curl outwardly.

10. An artificial bait comprising a member having one or more flexible elements thereon, said flexible element or elements having impregnated on one surface thereof a substance adapted to swell when the bait is placed in water, to cause movement of said element or elements in the water.

FRED A. ARBOGAST.